United States Patent [19]

St. John

[11] 4,395,316
[45] * Jul. 26, 1983

[54] HYDROGEN PRODUCTION BY BIOMASS PRODUCT DEPOLARIZED WATER ELECTROLYSIS

[75] Inventor: Michael R. St. John, Chicago, Ill.

[73] Assignee: Institute of Gas Technology, Chicago, Ill.

[*] Notice: The portion of the term of this patent subsequent to Jul. 27, 1999, has been disclaimed.

[21] Appl. No.: 369,534

[22] Filed: Apr. 19, 1982

Related U.S. Application Data

[63] Continuation-in-part of Ser. No. 234,692, Feb. 17, 1981, Pat. No. 4,341,608.

[51] Int. Cl.³ ............................................. C25B 1/04
[52] U.S. Cl. ...................................... 204/129; 204/128
[58] Field of Search ................................. 204/129, 131

[56] References Cited

U.S. PATENT DOCUMENTS

| | | | |
|---|---|---|---|
| 2,433,871 | 1/1948 | Sutherland et al. | 204/129 |
| 4,124,539 | 11/1978 | Horowitz et al. | 252/182.1 |
| 4,200,515 | 4/1980 | Hall et al. | 204/129 |
| 4,235,863 | 11/1980 | Schulten et al. | 204/129 |
| 4,341,608 | 7/1982 | St. John | 204/129 |

Primary Examiner—R. L. Andrews
Attorney, Agent, or Firm—Thomas W. Speckman

[57] ABSTRACT

A process for hydrogen production by water electrolysis and a process of depolarizing the anode of a water electrolysis cell by oxidizing a biomass product which may be monosaccharides, lignins, and mixtures thereof. The process of this invention avoids molecular oxygen evolution and results in high purity hydrogen at cell potentials substantially less than required for normal water electrolysis involving oxygen evolution. The process utilizes biomass products which are readily available and cost effective. High consumption of biomass product is achieved with an anode of lead-rich ruthenium polychlore compounds.

52 Claims, 3 Drawing Figures

HYDROGEN PRODUCTION BY BIOMASS PRODUCT DEPOLARIZED WATER ELECTROLYSIS

CROSS REFERENCE TO RELATED APPLICATION

This application is a continuation-in-part of my application Ser. No. 234,692, filed Feb. 17, 1981, now U.S. Pat. No. 4,341,608.

BACKGROUND OF THE INVENTION

1. Field of the Invention

This invention relates to a process for production of hydrogen from water by electrolysis. More particularly, this invention relates to depolarizing the anode of a water electrolysis cell by oxidizing a biomass product which may be monosaccharides, lignins, and mixtures thereof, thereby avoiding molecular oxygen evolution. The process of this invention produces high purity hydrogen electrolytically at cell potentials substantially less than required for normal water electrolysis involving oxygen evolution. The utilization of biomass product provides a cost effective material to depolarize the anode in water electrolysis process. High consumption of biomass product has been achieved with an anode of lead-rich ruthenium pyrochlore compounds.

2. Description of the Prior Art

The use of organic materials to reduce hydrogen overvoltage in electrolysis of brine by addition of a hydroxy carboxylic acid and a phosphorus containing organic compound to the catholyte is taught by U.S. Pat. No. 3,954,581. The organic material added to the brine is not involved in any electrochemical reaction. U.S. Pat. No. 4,175,013 teaches a method of production of oxygen and hydrogen from water in which formaldehyde is electrolyzed cathodically to hydrocarbons of low molecular weight such as methane and ethane, and water being anodically oxidized to oxygen. U.S. Pat. No. 4,160,816 teaches a high hydrogen overvoltage to increase production of formic acid and reduce hydrogen production at the cathode. U.S. Pat. No. 4,089,761 teaches a sewage treatment process wherein oxygen for supply to aerobic or microorganisms is produced at the anode of an electrolytic cell meaintained in the biodigestion compartment of the sewage treatment cell with the cathode being isolated so as to vent hydrogen out of the cell.

The electrolytic oxidation of dextrose in the manufacture of calcium gluconate is known as described in the article "Manufacture of Calcium Gluconate by Electrolytic Oxidation of Dextrose" by H. S. Isbell, Harriet L. Frush and F. J. Bates, Industrial and Engineering Chemistry, Vol. XXIV, No. 4, April 1932, pps. 375-378, wherein it is taught that $CaBr_2$ is necessary as a catalyst. The article "Electrolytic Preparation of Calcium Gluconate and Other Salts of Aldonic Acids" by Colin G. Fink and Donald B. Summers, Transactions of the Electrochemical Society, 74, 625 (1938), teaches that alkali ferricyanide may be used as a substitute for the alkali bromide as a catalyst in the electrolytic preparation of calcium gluconate. The commercial processes for oxidation of sugars to acids are indirect oxidations, that is, the electrochemical reaction is reduction of bromine followed by a subsequent chemical oxidation reaction.

The Applicant is not aware of prior art wherein a direct electrochemical oxidation reaction oxidizing organic material in the electrolyte is used for depolarization of the anode of a water electrolysis cell thereby avoiding molecular oxygen evolution and reducing the electrolysis power requirements for the production of hydrogen. Nor is the applicant aware of any teachings of the high consumption of biomass product with use of lead-rich ruthenium pyrochlore compounds for the anode of such water electrolysis cells.

SUMMARY OF THE INVENTION

This invention relates to a process for hydrogen production by water electrolysis and a process of depolarizing the anode of a water electrolysis cell. An electrical potential is maintained across an anode in an anode zone and a cathode in a cathode zone of an electrolytic cell. In the anode zone, oxidizable biomass product selected from the group consisting of monosaccharides, lignins and mixtures thereof, is oxidized with aqueous electrolyte material producing an oxidized biomass product, hydrogen ions and electrons. The hydrogen ions are transported through the electrolyte to the cathode zone, there forming molecular hydrogen.

The anode zone reaction may be written as Reaction I and the cathode zone reaction may be written as Reaction II, as follows:

Reaction I

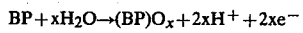

$$BP + xH_2O \rightarrow (BP)O_x + 2xH^+ + 2xe^-$$

wherein BP represents oxidizable biomass product selected from the group consisting of monosaccharides, lignins and mixtures thereof.

Reaction II

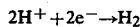

$$2H^+ + 2e^- \rightarrow H_2$$

The above reaction system operates at electrolysis voltage and power requirements for the electrolytic production of hydrogen by changing the electrochemical reaction and avoiding the formation of molecular oxygen. The electrolysis cells of this invention operate at electrical potentials of less than about 1.5 volts.

Lead-rich ruthenium pyrochlore compounds have been found to be particularly suitable for use as anodes in the process of this invention for high consumption of biomass product and high $CO_2$ production.

Accordingly, it is an object of this invention to provide a process for hydrogen production by water electrolysis at cell potentials of less than 1.5 volts.

Another object of this invention is to provide a process for high purity hydrogen production by water electrolysis which avoids molecular oxygen evolution.

Yet another object of this invention is to provide a process for hydrogen production by water electrolysis involving direct electrochemical oxidation of cost effective oxidizable organic material.

Still another object of this invention is to provide a process for depolarizing the anode of a water electrolysis cell by direct electrochemical oxidation of oxidizable biomass product.

These and other objects, advantages and features of this invention will be apparent from the description taken together with the drawing describing preferred embodiments in detail.

DESCRIPTION OF PREFERRED EMBODIMENTS

Figure 1:
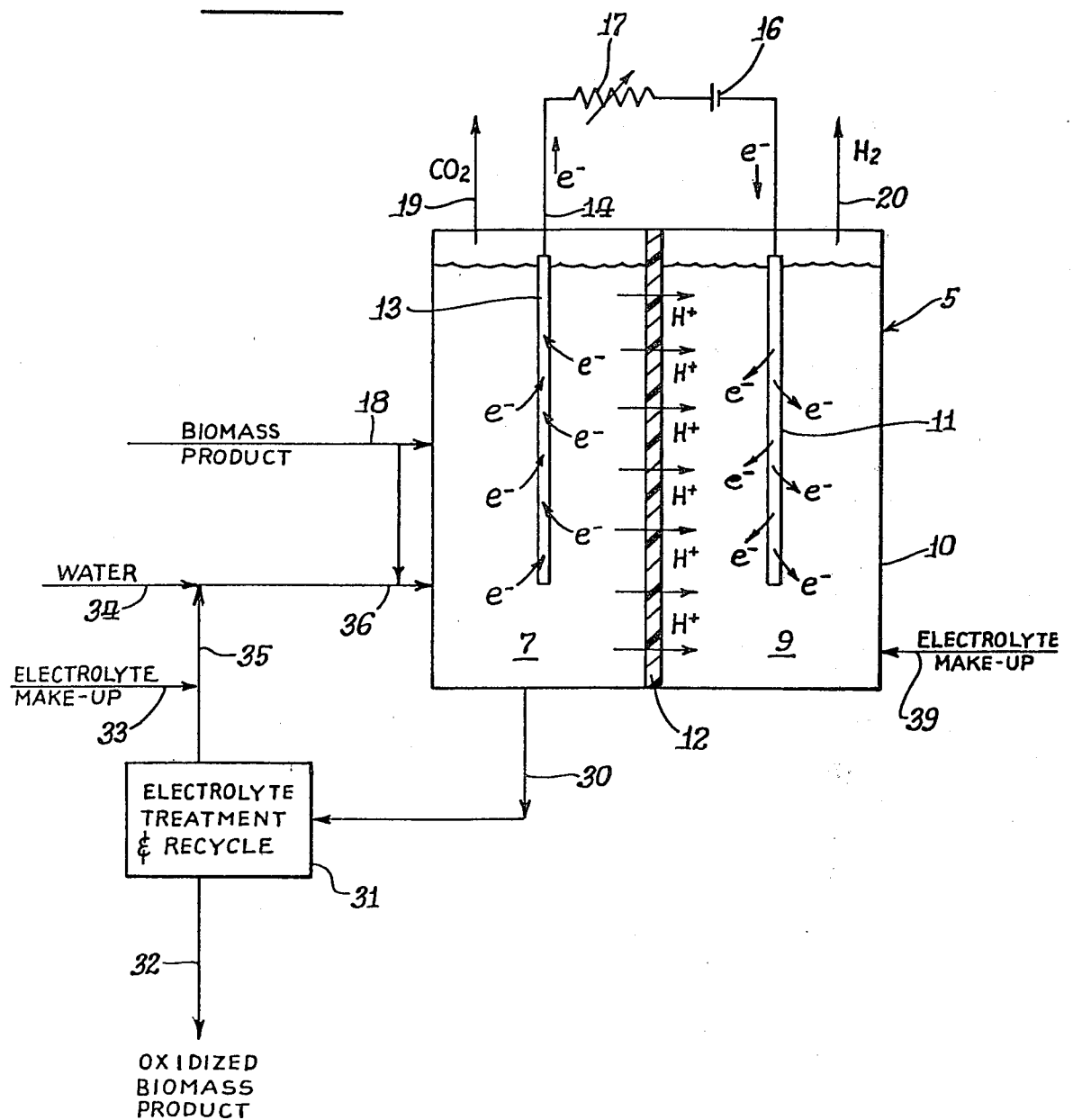
FIG. 1 schematically shows an electrolytic cell for use in the process for hydrogen production by one embodiment of this invention.

Referring to FIG. 1, the process for hydrogen production by biomass product depolarized water electrolysis may be conducted in electrolytic cell 5 comprising anode zone 7 with anode 13 and cathode zone 9 with cathode 11, the anode and cathode zones being separated by ion porous separator 12. Separator 12 affords ionic interaction between the anode compartment and the cathode compartment for ease of separate gas recovery from the cell, but is not necessary for cell operation. An electrical potential is maintained across anode 13 and cathode 11 by an external bias circuit comprising power source 16 and variable control 17 connected across anode electrical lead 14 and cathode electrical lead 15. One of the features of this invention is that an electrical potential of less than about 1.5 volts and preferably about 0.5 to about 1.0 volts is suitable for the hydrogen production by biomass product depolarized water electrolysis. Aqueous acid and basic electrolytes are suitable for facilitating the hydrogen ion transfer from the anode zone to the cathode zone. Oxidizable biomass product selected from the group consisting of monosaccharides, lignins and mixtures thereof are added to anode zone 7 by biomass product feed 18. By the electrochemical process taking place in the anode zone, as set forth in Reaction I above, the oxidizable biomass product is oxidized with water to produce hydrogen ions, electrons and oxidized biomass product. Complete oxidation of the oxidizable biomass product yields $CO_2$ which is withdrawn through anode zone gas withdrawal conduit 19, but generally, the oxidizable biomass product will not be fully oxidized, but oxidized to a degree of oxidation less than $CO_2$. The electrolyte and liquid and solid oxidized biomass product may be withdrawn through anode zone withdrawal conduit 30. Electrolyte treatment and recycle means 31 is provided to regenerate electrolyte for recycle to the anode zone and may include suitable pumping means and separation means for withdrawal of oxidized biomass product through oxidized biomass product discharge conduit 32. Fresh electrolyte is then recycled back to anode zone 7 through conduits 35 and 36 with provision for electrolyte makeup through conduit 33 and water addition through conduit 34. Since water is consumed in the electrochemical reaction taking place in anode zone 7, it may be desirable to add water separate from electrolyte.

As shown in the figure, hydrogen ion transport takes place through the aqueous electrolyte with the hydrogen ions passing through separator 12 into cathode zone 9 for the electrochemical reaction set forth in Reaction II above for molecular hydrogen production. Molecular hydrogen is the only gaseous chemical product produced in cathode zone 9 and thus may be withdrawn as pure molecular hydrogen through cathode zone gas withdrawal conduit 20. Electrolyte makeup for cathode zone 9 is provided by electrolyte makeup conduit 39.

The process for hydrogen production by biomass product depolarized water electrolysis according to this invention may be carried out in an electrolytic cell of any configuration known to the art and may be conducted in any manner known to the art so long as oxidizable biomass product is oxidized in the anode zone, hydrogen ions formed thereby transported through an electrolyte to the cathode zone and molecular hydrogen is formed in the cathode zone due to an electrical potential maintained between the anode and cathode. Accordingly, cell container 10 may be of any suitable material and shape known to the art and may be used in association with other like or different type cells in various manners and relationships known to the art.

One of the important features of this invention is the use of oxidizable biomass product selected from the group consisting of monosaccharides, lignins and mixtures thereof for reaction in the anode chamber. This avoids molecular oxygen evolution and reduces the electrolysis voltage and thereby, the power requirements for electrolytic production of hydrogen. Monosaccharides are well known to be derivable from natural biomass materials produced by growing plants such as cellulose and hemicellulose. Any oxidizable monosaccharide is suitable for use in this invention including the hexoses and pentoses such as glucose, fructose, arabinose and xylose. When monosaccharides are used as the oxidizable biomass product, it is preferred to use aqueous acidic electrolytes. Any lignin having an oxidizable functional group is satisfactory for use in this invention, such as alkali lignins obtained by acidification of an alkaline extract of wood and those obtained from other treatments of cellulosic fibers. When lignins are used, it is suitable to use either alkaline or acidic electrolytes. When mixtures of monosaccharides and lignins are used as an oxidizable biomass product according to this invention, it is preferred to use acidic electrolytes. Thus, it is seen that the oxidizable biomass product used for this invention represents readily available and economic biomass products which are readily renewable. For example, glucose, a preferred monosaccharide, may be readily derived from biomasses such as municipal wastes, agricultural wastes and forest product wastes, while lignins, such as alkaline lignins may be derived from kraft pulping effluents. The oxidizable biomass product may be added to the electrolytic cell in a water or electrolyte solution. Suitable concentration of oxidizable biomass product monosaccharides in the electrolyte of the anode zone is about 0.1 to 2.0 Molar, preferably about 0.8 to about 1.2 Molar. Suitable concentration of oxidizable biomass product lignins in the electrolyte of the anode zone is about 10 to about 300 grams/liter, preferably about 100 to 150 grams/liter.

Suitable electrolytes for use in the process of this invention include aqueous acidic electrolytes, preferably those wherein the acid is selected from the group consisting of hydrochloric, sulfuric, perchloric and phosphoric acids. Suitable acid concentration in the aqueous electrolytes is about 0.1 to 10 Molar, preferably about 0.5 to 1.5 Molar. Suitable aqueous basic electrolytes include those having a base concentration of about 0.1 to 6 Molar, preferably wherein the base is selected from the group consisting of sodium hydroxide and potassium hydroxide, It is preferred that the concentration of base in the electrolyte be about 0.5 to 1.0 Molar.

Any suitable hydrogen ion passing separator materials may be used to separate the anode zone from the cathode zone, particularly for ease of gas collection. Suitable separator materials are well known in the art and include Nafion (a sulfonated perfluoropolyethylene sold by DuPont), nitrocellulose, cellulose acetate, and other fluorocarbon ion exchange membranes.

Many suitable metallic electrode materials known to the art may be used in the process of this invention such as platinized platinum, platinum-tungsten, platinum-tantalum, well known Raney alloys, nickel, and lead-rich ruthenium pyrochlore compounds. For high biomass consumption and $CO_2$ production, it is preferred that the anode be lead-rich ruthenium pyrochlore compounds such as those having the formula $$Pb_2[Ru_{2-x}Pb_x]O_{7-y}$$

wherein x is greater than 0 and less than or equal to about 1.2 and y is greater than or equal to 0 and less than or equal to about 1.0. Further disclosure of compounds according to the above formula and their production is disclosed in U.S. Pat. No. 4,124,539.

The electrolytic cell may be operated at ambient pressures and temperatures and preferably at somewhat higher than ambient temperatures to promote the electrochemical oxidation of the organic material. Temperatures of above about 20° C. are suitable, and preferred temperatures are in the range of about 60° to 90° C., about 70° to 90° being most preferred. The lead-rich ruthenium polychlore anode provides operation in the lower temperatures of these ranges.

One of the important features of this invention is the reduction of power requirements for production of hydrogen by water electrolysis. This is achieved by the anode zone oxidation of oxidizable biomass product with electrical potentials of less than about 1.5 volts. Conventional water electrolysis requires about 1.5 to 2.0 volts. According to the process of this invention, electrical potential of about 0.5 to about 1.0 volts is suitable to generate current densities of greater than about 50 $mA/cm^2$. On the basis of standard free energies of formation, a theoretical potential for the overall cell reaction using glucose can be calculated to be +0.013 V, a spontaneous reaction. Thus, considerable overpotential can be tolerated while still retaining a potential well below that required for conventional water electrolysis. Voltages as low as 0.6 volts have been used in experimental cells in the production of hydrogen by water electrolysis according to this invention wherein the anode is depolarized by use of glucose.

This invention also includes the process of depolarizing the anode of a water electrolysis cell by oxidizing in the anode zone oxidizable biomass products selected from the group consisting of monosaccharides, lignins and mixtures thereof with water producing oxidized biomass product, hydrogen ions and electrons, thereby avoiding molecular oxygen evolution. This is readily seen by reference to Reaction I set forth above, the conditions for which have been set forth with respect to the process for hydrogen production described above.

Another feature of this invention is the production of useful products by the oxidation of oxidizable biomass products, such as, for example, the production of acids, such as gluconic acid from the oxidation of glucose and other oxidized products. These products may be isolated and marketed as useful products.

The following examples are set forth in detail to illustrate specific embodiments of this invention and are not intended to limit the invention.

EXAMPLE I

Figure 2:
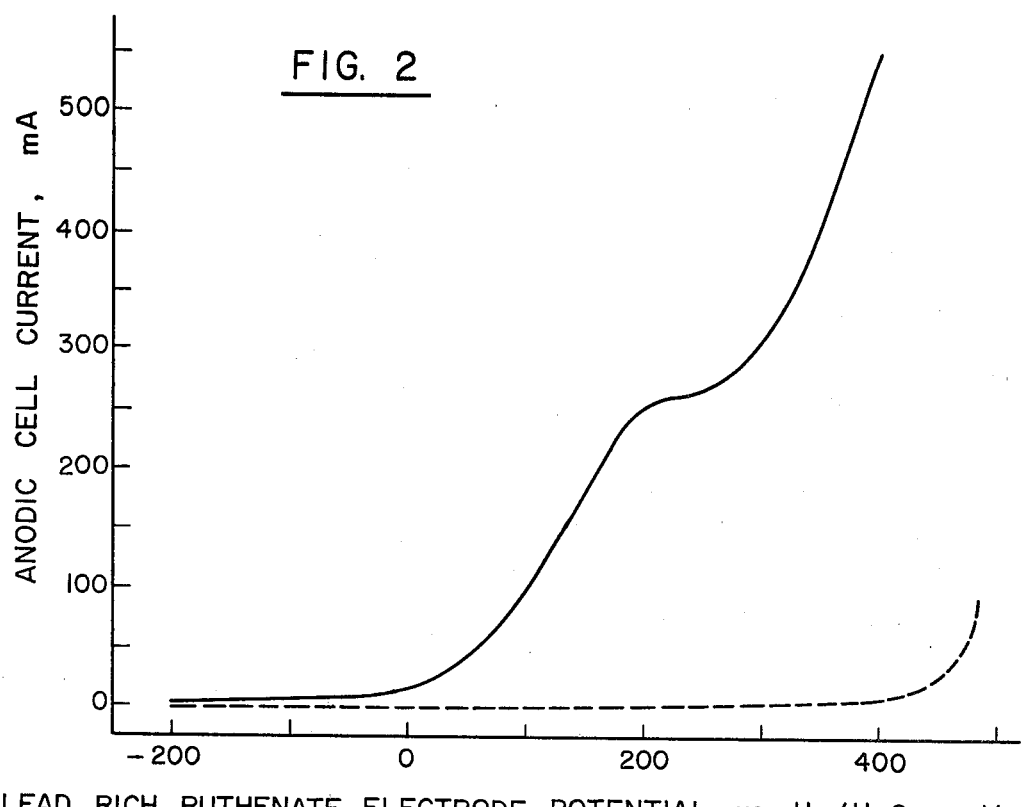
FIG. 2 shows current-potential curves for a lead-rich ruthenium pyrochlore anode in basic electrolyte.

Lead-rich ruthenium polychlore compound having an average formula $$Pb_2[Ru_{1.82}Pb_{0.18}]O_{7-y}$$

was prepared by mixing $Pb(NO_3)_2$ and $RuO_2$ in amounts having a Pb to Ru ratio of about 4/1 moles. The mixture was reacted in air at 400° C. for 1.75 hours and at 600° C. for an additional 22 hours, with 5 regrindings. The reacted powder was washed at room temperature in 0.1 N acetic acid for 1.5 hours and then 0.05 N acetic acid for 1.7 hours to remove excess lead oxide. An electrode was made by Teflon bonding of the lead-rich ruthenium polychlore powder to a platinum screen current collector. Steady-state current-potential points were measured for a lead-rich ruthenium polychlore electrode of about 3 $cm^2$ in 6.1 M KOH at 25° C. The potential was increased in 6 steps/min. at 10 mV/step. The potential of the lead-rich ruthenium polychlore electrode was compared to a Hg/HgO electrode. FIG. 2, by the dashed curve, shows the current-potential curve. The current-potential curve was then measured with 0.50 M glucose added to the electrolyte and is shown in FIG. 2 by the solid line. In FIG. 2, it is shown that in the presence of glucose appreciable oxidative currents are generated prior to the voltage at which oxygen evolution occurs without the presence of added glucose. The gas evolved when glucose was present was identified as $CO_2$. The shift to more negative potentials is, for example, 375 mV at 100 mA at ambient temperature.

EXAMPLE II

Figure 3:
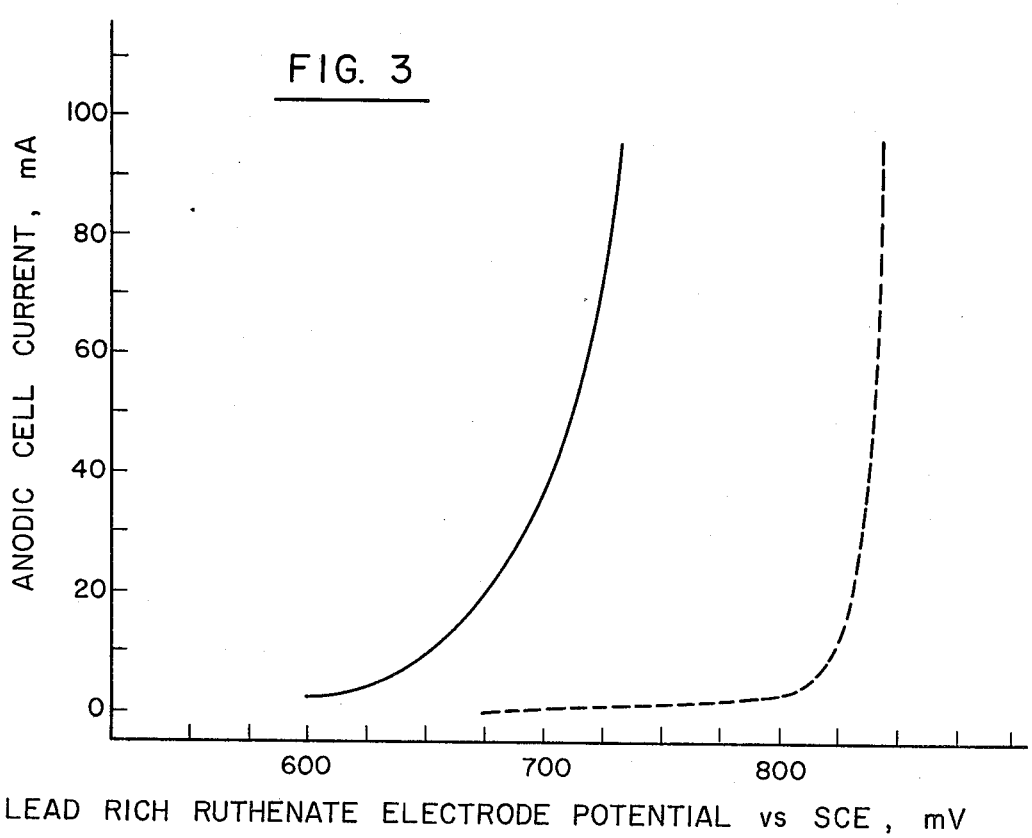
FIG. 3 shows current-potential curves for a lead-rich ruthenium pyrochlore anode in acid electrolyte.

A lead-rich ruthenium polychlore electrode having a geometrical area of 3 $CM^2$ was prepared as described in Example I. Steady-state current-potential measurements were obtained in a 0.50 M $H_2SO_4$ electrolyte at 61° C. in the same manner as described in Example I except that the lead-rich ruthenium polychlore electrode potential was compared with a Standard Calomel Electrode (SCE). The results are shown in FIG. 3 with the dashed curve showing the acid electrolyte alone and the solid curve showing the acid electrolyte with 0.50 M added glucose. FIG. 3 shows the cell current reaches appreciable values by oxidation of glucose at potentials more negative than oxygen evolution in the acid electrolyte alone, about 300 mV at 50 mA. The gas evolved when glucose was present was identified as $CO_2$.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:
1. A process for hydrogen production by biomass product depolarized water electrolysis comprising: maintaining an electrical potential across an anode comprising metal selected from the group consisting of nickel and lead-rich ruthenium polychlore compounds having a formula $Pb_2[Ru_{2-x}Pb_x]O_{7-y}$ wherein x is greater than 0 and less than or equal to about 1.2 and y is greater than or equal to 0 and less than or equal to about 1.0 in a metallic anode zone and a metallic cathode in a cathode zone of an electrolytic cell; oxidizing, in an aqueous electrolyte in said electrolytic cell anode zone, oxidizable biomass product selected from the group consisting of monosaccharides, lignins and mixtures thereof with water producing oxidized biomass product, hydrogen ions and electrons; transporting said hydrogen ions through said electrolyte to said cathode zone; forming molecular hydrogen in said cathode zone.

2. The process of claim 1 wherein said anode comprises nickel.

3. The process of claim 1 wherein said anode comprises $Pb_2[Ru_{2-x}Pb_x]O_{7-y}$.

4. The process of claim 3 wherein said lead-rich ruthenium polychlore has an average formula $Pb_2[Ru_{1.82}Pb_{0.18}]O_{7-y}$.

5. The process of claim 1 wherein said electrical potential is less than about 1.5 volts.

6. The process of claim 5 wherein said electrical potential is about 0.5 to about 1.0 volts.

7. The process of claim 1 wherein said biomass product comprises monosaccharide.

8. The process of claim 7 wherein said monosaccharide comprises glucose.

9. The process of claim 7 wherein said monosaccharide has a concentration of about 0.1 to about 2.0 Molar in said aqueous electrolyte.

10. The process of claim 9 wherein said monosaccharide concentration is about 0.8 to about 1.2 Molar.

11. The process of claim 1 wherein said electrolyte comprises an aqueous acid of about 0.1 to about 10 Molar concentration.

12. The process of claim 11 wherein said acid is selected from the group consisting of hydrochloric, sulfuric, perchloric and phosphoric and said concentration is about 0.5 to about 1.5 Molar.

13. The process of claim 11 wherein said biomass product comprises monosaccharide in a concentration of about 0.1 to about 2.0 Molar in said aqueous acid electrolyte.

14. The process of claim 1 wherein said electrolytic cell is maintained at temperatures above about 20° C.

15. The process of claim 14 wherein said temperatures are about 60° to about 90° C.

16. The process of claim 1 wherein said electrolytic cell is maintained at temperatures about 70° to about 90° C.

17. The process of claim 1 wherein said biomass product comprises lignin.

18. The process of claim 17 wherein said lignin has a concentration of about 10 to about 300 grams/liter in said aqueous electrolyte.

19. The process of claim 18 wherein said lignin concentration is about 100 to about 150 grams/liter.

20. The process of claim 17 wherein said electrolyte comprises an aqueous base of about 0.1 to about 6 Molar concentration.

21. The process of claim 20 wherein said base is selected from the group consisting of sodium hydroxide and potassium hydroxide and said concentration is about 0.5 to about 1.0 Molar.

22. The process of claim 20 wherein said biomass product comprises lignin in a concentration of about 10 to about 300 grams/liter in said aqueous basic electrolyte.

23. The process of claim 17 wherein said electrolyte comprises an aqueous acid of about 0.1 to about 10 Molar concentration.

24. The process of claim 23 wherein said acid is selected from the group consisting of hydrochloric, sulfuric, perchloric and phosphoric and said concentration is about 0.5 to about 1.5 Molar.

25. The process of claim 1 wherein said hydrogen ions are transported through a hydrogen ion passing separator separating said anode zone from said cathode zone.

26. The process of claim 1 wherein said metallic cathode is selected from the group consisting of platinized platinum, platinum-tungsten, platinum tantalum, Raney alloys, nickel and lead-rich ruthenium polychlore compounds having a formula $Pb_2[Ru_{2-x}Pb_x]O_{7-y}$.

27. A process of depolarizing the anode of a water electrolysis cell having an electrical potential across a metallic anode selected from the group consisting of nickel and lead-rich ruthenium polychlore compounds having a formula $Pb_2[Ru_{2-x}Pb_x]O_{7-y}$ wherein x is greater than 0 and less than or equal to about 1.2 and y is greater than or equal to 0 and less than or equal to about 1.0 in an anode zone and a metallic cathode in a cathode zone comprising: oxidizing in said anode zone oxidizable biomass product selected from the group consisting of monosaccharides, lignins and mixtures thereof with water producing oxidized biomass product, hydrogen ions and electrons, thereby avoiding molecular oxygen evolution.

28. The process of claim 27 wherein said anode comprises nickel.

29. The process of claim 27 wherein said anode comprises $Pb_2[Ru_{2-x}Pb_x]O_{7-y}$.

30. The process of claim 29 wherein said lead-rich ruthenium polychlore has an average formula $Pb_2[Ru_{1.82}Pb_{0.18}]O_{7-y}$.

31. The process of claim 27 wherein said electrical potential is less than about 1.5 volts.

32. The process of claim 27 wherein said electrical potential is about 0.5 to about 1.0 volts.

33. The process of claim 27 wherein said biomass product comprises monosaccharide.

34. The process of claim 33 wherein said monosaccharide comprises glucose.

35. The process of claim 33 wherein said monosaccharide has a concentration of about 0.1 to about 2.0 Molar in said aqueous electrolyte.

36. The process of claim 35 wherein said monosaccharide concentration is about 0.8 to about 1.2 Molar.

37. The process of claim 27 wherein said electrolyte comprises an aqueous acid of about 0.1 to about 10 Molar concentration.

38. The process of claim 37 wherein said acid is selected from the group consisting of hydrochloric, sulfuric, perchloric and phosphoric and said concentration is about 0.5 to about 1.5 Molar.

39. The process of claim 37 wherein said biomass product comprises monosaccharide in a concentration of about 0.1 to about 2.0 Molar in said aqueous acid electrolyte.

40. The process of claim 27 wherein said electrolytic cell is maintained at temperatures above about 20° C.

41. Thr process of claim 40 wherein said temperatures are about 60° to about 90° C.

42. The process of claim 27 wherein said electrolytic cell is maintained at temperatures about 70° to about 90° C.

43. The process of claim 27 wherein said biomass product comprises lignin.

44. The process of claim 43 wherein said lignin has a concentration of about 10 to about 300 grams/liter in said aqueous electrolyte.

45. The process of claim 44 wherein said lignin has a concentration of about 100 to about 150 grams/liter in said aqueous electrolyte.

46. The process of claim 27 wherein said electrolyte comprises an aqueous base of about 0.1 to about 6 Molar concentration.

47. The process of claim 46 wherein said base is selected from the group consisting of sodium hydroxide and potassium hydroxide and said concentration is about 0.5 to about 1.0 Molar.

48. The process of claim 46 wherein said biomass product comprises lignin in a concentration of about 10 to about 300 grams/liter in said aqueous basic electrolyte.

49. The process of claim 27 wherein said electrolyte comprises an aqueous acid of about 0.1 to about 10 Molar concentration.

50. The process of claim 49 wherein said acid is selected from the group consisting of hydrochloric, sulfuric, perchloric and phosphoric and said concentration is about 0.5 to about 1.5 Molar.

51. The process of claim 27 wherein said hydrogen ions are transported through a hydrogen ion passing separator separating said anode zone from said cathode zone.

52. The process of claim 27 wherein said metallic cathode is selected from the group consisting of platinized platinum, platinum-tungsten, platinum tantalum, Raney alloys, nickel and lead-rich ruthenium polychlore compounds having a formula $Pb_2[Ru_{2-x}Pb_x]O_{7-y}$.

* * * * *